Aug. 2, 1966  W. G. PIERCE  3,264,010
TORQUE BOX FRAME WITH PHEASANT TAIL SUPPORT
Filed April 17, 1964

INVENTOR.
WILLIAM G. PIERCE
BY
Andrus & Starke
ATTORNEYS

United States Patent Office 3,264,010
Patented August 2, 1966

3,264,010
TORQUE BOX FRAME WITH PHEASANT TAIL SUPPORT
William G. Pierce, Whitefish Bay, Wis., assignor to A. O. Smith Corporation, Milwaukee, Wis., a corporation of New York
Filed Apr. 17, 1964, Ser. No. 360,611
6 Claims. (Cl. 280—106)

This invention relates to a torque box frame with pheasant tail support, and more particularly to an automotive frame of the wide-hipped or perimeter type wherein torque box principles are utilized.

In recent years it has become desirable to lower passenger vehicles, both for purposes of visual aesthetics as well as for safety. One way of accomplishing this desired result has been to widen the vehicle frame substantially in the mid-region so that the passenger compartment may be cradled down within the frame.

For purposes of structural rigidity, such frames have sometimes included a torque box between the narrow end portions of the frame and the wider central portion. One such frame is disclosed and claimed in copending application Serial No. 223,087, filed on September 12, 1962, by John J. Duero and Glyn C. Traub and entitled, "Wide-Hipped Frame Having Integral Torque Box," now Patent No. 3,129,954, and assigned to a common assignee. In that application, the torque boxes comprise an integral tubular extension of the narrow end frame portion which curves abruptly outwardly on a transverse line extending along the end of the wider central portion. Also the rear engine support cross brace is disposed slightly forwardly of the juncture of the torque boxes and the wide frame mid-section.

In some instances it has been found desirable to dispose the engine rear support cross member within the widened frame portion. In such instance, the cross member will be substantially longer than the distance between side-rails at the extreme forward end of the frame.

Modern automobile design often requires an engine rear support member of substantial vertical stiffness. However, this stiffness varies inversely as the cube of the member's length. Moreover, this member is usually of small cross section, since it must cross beneath the engine and yet be above the ground clearance plane. It is therefore highly advantageous to utilize the shortest cross member possible.

The present invention is directed to a vehicle frame wherein the cross member in mid-section can be made much shorter than previously thought possible, while maintaining the advantages of the torque box concept.

The accompanying drawing illustrates the best mode presently contemplated by the inventor for carrying out the invention.

Figure 1:
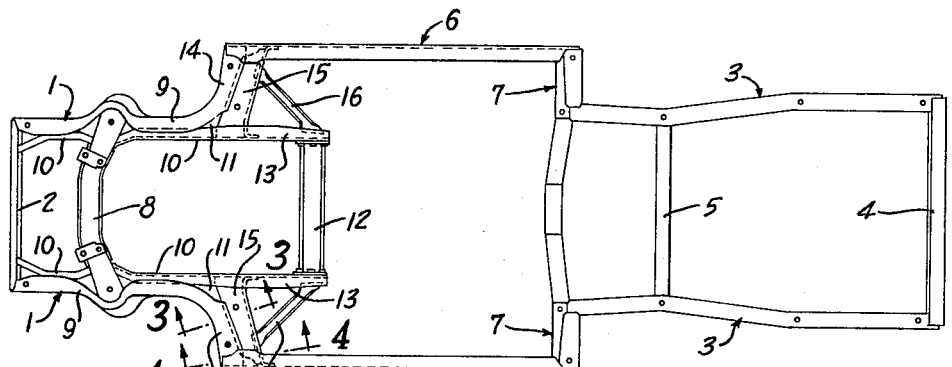
FIGURE 1 is a top plan view of a vehicle frame constructed in accordance with the invention.
Figure 2:
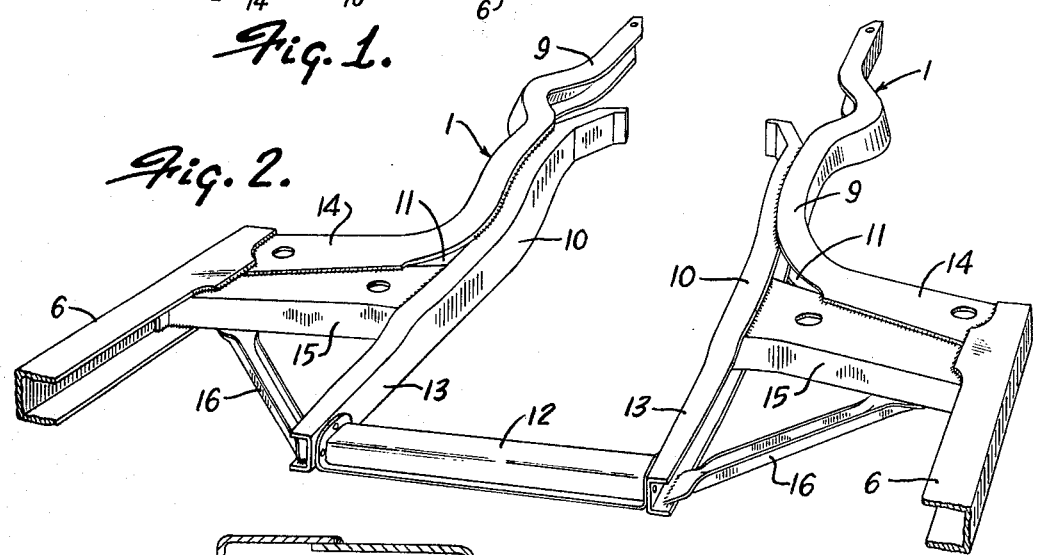
FIG. 2 is an enlarged fragmentary perspective view showing the construction of the torque box and pheasant tail portion of the frame.
Figure 3:
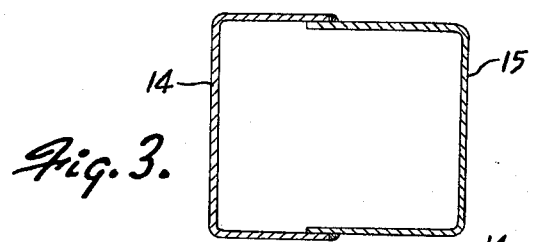
FIG. 3 is a section of the torque box taken on line 3—3 of FIGURE 1.
Figure 4:
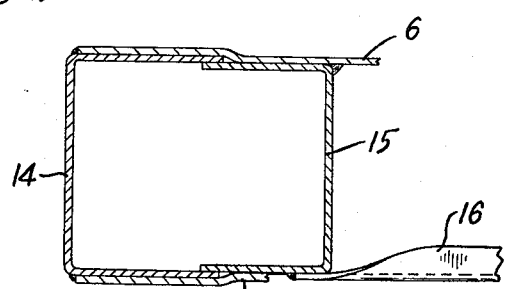
FIG. 4 is a section taken on line 4—4 of FIGURE 1.

As shown in the drawing, the frame embodying the invention generally comprises a pair of generally parallel front side rails 1 spaced a relatively short distance from each other and from the center longitudinal axis of the frame. Rails 1 form, together with an end cross brace 2, a relatively narrow front frame portion. The rear frame portion is also relatively narrow and comprises a pair of parallel spaced side rails 3 joined by a suitable end cross brace 4 and an intermediate cross brace 5. The middle portion of the frame is substantially wider than the narrow end portion and comprises a pair of substantially spaced parallel mid-section side rails 6 which are secured at their ends to the front and rear narrow frame portions. At the rear, the connection is shown as comprising transverse box members 7, although other suitable structure may be utilized.

Rear rails 3 and mid-rails 6 may be of any suitable well-known section. As shown, rails 3 are of downwardly facing channel section, while rails 6 are of inwardly facing channel section. Box construction might also be used.

The invention contemplates utilization of the torque box principal at either one or both frame ends. In addition, it is desired to mount the engine on a front cross brace 8 or adjacent structure and on an engine rear support of shortest possible length.

For this purpose, front side rails 1 each comprise a box formed from an outer channel member 9 and an inner channel member 10, the flanges of which face each other and overlap to form an enclosed tubular structure. Securement may be by any suitable means, such as welding. Members 9 and 10 are substantially continuous and integral throughout with the exception of a break in inner member 10 to receive the end portions of front engine brace 8.

In accordance with the invention, members 9 and 10 diverge just forwardly of the front ends of mid-section rails 6 as at 11. The extension of inner rail 10 continues rearwardly in a relatively straight manner and terminates substantially rearwardly of the front ends of rails 6 and spaced substantially inboard thereof. The rearward free ends of members 10 are joined to the outer ends of a transverse engine rear support cross member 12 as by bolts. Since the ends of member 12 terminates substantially inwardly of rails 6, member 12 is shorter than would otherwise be possible and is of substantial vertical stiffness, as desired.

Rearwardly of the divergence 11, the extension of outer side rail member 9 is splayed abruptly outboard to almost a transverse direction and terminates at the front end terminus portion of mid-section rail 6, to which it is secured as by welding.

Both the pheasant tail extension 13 of inner rail 10 and the abruptly curved extension 14 of outer rail 9 are kicked downwardly so that the mid-section of the frame is lower than the front end portion.

The flanges of extension 14 face inwardly. In order to provide a suitable torque box in this area, a short channel 15 is inserted so that its flanges face and overlap the flanges of extension 14 to close this open area and form a box section of high rigidity. Channel 15 extends diagonally between pheasant tail extension 13 behind divergence 11 and to the front end portion of mid-section rail 6 just behind the outer end of extension 14. All these members are secured together, as by welding.

Figure 5:
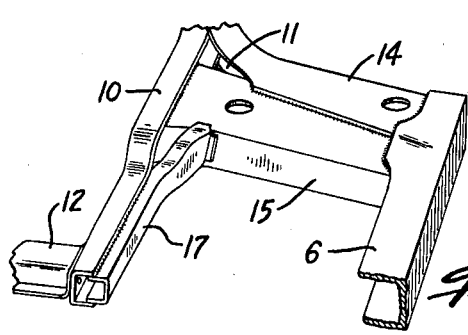
FIG. 5 is a fragmentary perspective showing another embodiment of FIG. 2.

It has been found that further bracing of pheasant tail extension 13 may occasionally be necessary, depending on the gauge and section of pheasant tail 13 and/or the load carried by cross member 12. For this purpose, a diagonal brace 16 is secured to the frame, as by welding, and extends from the rearward end of tail extension 13 adjacent the junction with rear engine brace 12, and forwardly and outwardly to the outer end portion of torque box channel 15. FIG. 5 shows a second embodiment wherein the diagonal brace 17 is channel-shaped and extends between the inner end of channel 15 and the rear end portion of tail 13, overlapping and closing the latter.

The invention provides a vehicle frame of novel construction. The novel torque box utilizing a short closing member, together with the pheasant tail support for a shortened engine rear support member, create a frame of high rigidity in the dash area and which is relatively inexpensive to manufacture.

Various modes of carrying out the invention are contemplated as being within the scope of the following claims particularly pointing out and distinctly claiming the subject matter which is regarded as the invention.

I claim:

1. In a vehicle frame having narrow end portions and a wider central portion joining said narrow portions, structure comprising:
    (a) a pair of transversely spaced generally parallel side rails forming the forward narrow end portion of said frame;
    (b) each said rail comprising an inner and an outer channel member with the flanges of said members in facing relationship and secured together to form a box-like section,
    (c) said inner and outer members diverging forwardly of the forward end terminus of said wider central frame portion,
    (d) said inner members extending integrally and rearwardly from the point of divergence to substantially rearwardly of the forward end of said wider central frame portion to form a pheasant tail and terminating in free end portions inboard of said wider portion,
    (e) a cross member of relatively short length extending between said inner members, the ends of said cross member being secured to the rearward free ends of said inner members,
    (f) each of said outer side rail member being splayed abruptly outwardly rearwardly from the point of said divergence to form a front torque box portion secured to the forward end terminus of said wider central frame portion,
    (g) and a short channel member extending between said pheasant tail and said forward end of said wider central frame portion and secured thereto, the flanges of said short channel member facing the flanges of said splayed portion of said outer member and being secured thereto to form the rear torque box portion, so that a closed torque box is provided.

2. The frame of claim 1 which includes: a brace extending diagonally between the rear end of said pheasant tail to the outer end portion of said short channel member (g) and secured thereto.

3. The frame of claim 1 which includes: a diagonal channel member extending and secured between the rear end portion of said pheasant tail and said short channel member (g), said diagonal channel member overlapping and closing said pheasant tail.

4. In a vehicle frame having a narrow front end portion and a wider central portion, structure comprising:
    (a) a pair of transversely spaced generally parallel side rails forming said narrow front end portion,
    (b) a transverse front engine support extending between said side rails and secured thereto,
    (c) each said side rail comprising an inner and an outer channel member with the flanges of said members disposed in facing relationship and secured together to form a box-like section,
    (d) said inner and outer members diverging forwardly of the forward end of said wider central frame portion,
    (e) said inner members extending integrally and rearwardly from the point of divergence to rearwardly of the front end terminus of said wider central frame portion to form a pheasant tail which terminates in free end portions inboard of said wider portion,
    (f) a transverse rear engine support of relatively short length extending between the terminating rear free end portions of said pheasant tails,
    (g) each said outer side rail member being splayed abruptly outwardly behind the point of said divergence to form a front torque box portion secured to the forward end terminus of said wider central frame portion,
    (h) and a short channel member extending from said pheasant tail to just rearwardly of the point of securement of said front torque box portion to said wider central frame portion, the flanges of said short channel member facing the flanges of said front torque box portion and being secured thereto to form the rear torque box portion, to thereby provide a closed torque box.

5. The frame of claim 4 which includes: a brace extending diagonally between the rear end of said pheasant tail to the outer end portion of said short channel member (h) and secured thereto.

6. The frame of claim 4 which includes: a diagonal channel member extending and secured between the rear end portion of said pheasant tail and said short channel member (h), said diagonal channel member overlapping and closing said pheasant tail.

References Cited by the Examiner

UNITED STATES PATENTS

| 2,173,516 | 9/1939 | Eklund | 280—106 |
| 2,229,371 | 1/1941 | Chayne | 280—106 |
| 3,105,701 | 10/1963 | Schilberg | 280—106 |
| 3,108,836 | 10/1963 | Deckert | 280—106 X |

BENJAMIN HERSH, *Primary Examiner.*

P. GOODMAN, *Assistant Examiner.*